Patented Sept. 16, 1952

2,610,920

UNITED STATES PATENT OFFICE 2,610,920

FLAMEPROOFING COMPOSITION

Harry Hopkinson, Lawrenceville, N. J.

No Drawing. Application November 1, 1948,
Serial No. 57,822

7 Claims. (Cl. 106—15)

This invention relates to compositions adapted to flameproof combustible materials such as textiles, paper, artificial leather or the like. By the term "flameproof" is meant resistant to the support of a flame after the initiating source of the flame is withdrawn.

The flameproofing composition of my present invention provides a means for modifying the rate and temperature of evolution of hydrochloric acid from hydrochloric acid liberating organic materials by balancing inhibitors and metal oxides capable of forming oxychlorides at high temperatures to achieve a flameproof complex at the combustion temperature and includes one or more metallic oxides, a chlorinated material and an inhibitor acting in this unique way with the chlorinated material. I have found that my composition possesses effective flameproofing properties and is also water insoluble in all its ingredients so that the flameproofness of the material treated with my composition is preserved despite weathering or repeated laundering.

I attribute the flameproofing effectiveness of my composition to its ability to form metallic oxychloride-cellulose complexes when exposed to hydrochloric acid, liberated by the chlorinated material, in the presence of cellulose at combustion temperatures, and to that end the inhibitor employed as one element of my composition plays an important part; namely, it retards the liberation of hydrochloric acid from the chlorinated material while the latter is heated and until the temperature is reached at which the complex is formed. Although I do not wish to commit myself unnecessarily to any specific theory yet the foregoing explanation seems to account for the unusual effectiveness of my composition as contrasted with several prior compositions having ingredients similar to mine.

In addition to the three above described elements of my composition, namely, the metallic oxide, the chlorinated material and the inhibitor, my composition preferably also includes one or more metallic salts of weak inorganic acids, which enhance the flameproofing effectiveness, and also certain amines, amides or amine salts which greatly reduce after-glow, as is very desirable in certain fields of use, and also reduces the tendency to mildew.

In making my composition, a powder is first made up of all the dry ingredients and the powder is then compounded with the chlorinated material. Alternatively the powder may be compounded with the chlorinated material by adding each of the ingredients of the powder in turn to the chlorinated material. I shall describe in detail first the powders and their ingredients and then the chlorinated materials.

A. The powders include:

1. The metallic oxides, present in an amount ranging from about 40% to about 65% and preferably about 45% of the weight of the powder. They consist preferably of zinc oxide, stannic oxide, lead oxide, magnesium oxide, ferric oxide, or mixtures thereof and also desirably other oxides alone or in admixture such as the oxides of manganese, molybdenum, tellurium, titanium, copper, chromium, aluminum, vanadium and tungsten.

2. The inhibitors may be inorganic, or metalloorganic. Their function is apparently to retard the liberation of hydrochloric acid from the chlorinated material while the latter is heated and until the temperature is reached at which the metallic oxychloride-cellulose complex is formed, thereby differing in function from the conventional stabilizer employed merely to stabilize the chlorinated material against dehydrochlorination during storage or use or under the influence of sunlight. The use of quantities adequate for my purpose is important and the quantity is gauged by the amount of metallic oxide used. The quantity required is about 20% or over but not over about 40% and preferably about 35% of the weight of the metallic oxide.

As such inhibitors I prefer basic lead carbonate, calcium silicate, lead silicate or lead sulfate but others may also be used, if in adequate quantities, such as calcium stearate, calcium salicylate, calcium ethyl aceto-acetate, lead oleate, lead naphthenate, dibasic lead salt of stearic acid, and other organo-metallic lead salts, strontium naphthenate, dibutyl tin maleate, tetraphenyl tin and other organic tin salts, metal caseinates and other metallo-organic salts.

3. The glow proofers and mildew proofers.—The problem of afterglow is a serious one in certain situations, such as in Army or Navy uniforms, where the afterglow upon extinguishment of the flame may be at a temperature even higher than that of flaming combustion and this problem is accentuated rather than alleviated by many prior flameproofing compounds which lengthen rather than shorten the afterglow. Where that is a problem my composition includes a glow proofer present in an amount which should be at least 10% and can range upwardly as high as 50% or more of the total weight of the powder, depending on the glow resistance desired.

Many amines and amides and various salts containing amine linkages are useful for this purpose. Particularly adapted for this use are the phosphates, borates, and silicates of the water-insoluble, long-chain amines, such, for instance, as octadecylamine phosphate, borate and silicate and rosin amine phosphate, borate and silicate.

Some of these materials, notably the rosin amine phosphate and borate impart the further desirable property of mildew-proofness, and also contribute to the flameproofness, as well as the glowproofness of my composition.

4. Metallic salts of weak organic acids may also be used in quantities, ranging from about 10% to about 25% and preferably about 15% of the weight of the powder, as they supplement the metallic oxides in imparting flameproofness.

The following represent some of the materials available for this purpose:

Lead stannate, titanium stannate, magnesium zincate, zinc stannate, zinc vanadate, antimony zincate, magnesium stannate, tin tungstate, tin molybdate, zinc borate, lead borate, zirconium silicate, and lead molybdate.

The following examples of mixtures illustrate powders made in accordance with the foregoing which in the presence of chlorinated materials impart flameproofness to cellulosic material.

Powder #1

| | |
|---|---|
| Zinc oxide | 70 |
| Magnesium oxide | 33 |
| Lead monoxide | 36 |
| Basic lead carbonate | 36 |
| Rosin amine phosphate | 45 |
| | 220 |

Powder #2

| | |
|---|---|
| Zinc oxide | 116 |
| Lead monoxide | 19 |
| Basic lead carbonate | 33 |
| Zinc stannate | 38 |
| | 211 |

Powder #3

| | |
|---|---|
| Zinc oxide | 170 |
| Lead monoxide | 36 |
| Basic lead carbonate | 72 |
| Octadecyl amine phosphate | 72 |
| Zinc borate | 50 |
| | 400 |

Powder #4

| | |
|---|---|
| Lead monoxide | 45 |
| Ferric oxide | 20 |
| Stannic oxide | 20 |
| Basic lead carbonate | 34 |
| Octadecyl amine phosphate | 36 |
| Zinc borate | 25 |
| | 180 |

Powder #5

| | |
|---|---|
| Zinc oxide | 89 |
| Basic lead carbonate | 34 |
| Rosin amine phosphate | 34 |
| | 157 |

B. *Chlorinated materials and compounding methods.*—The powders are usually ground in a plasticizer to form a paste before adding to the final flameproofing solution. The hydrochloric acid required for the described reaction may be incorporated in several ways, (a) by grinding the powder in a chlorinated plasticizer such as chlorinated paraffin, chlorinated diphenyls or methyl pentachlor stearate, etc., (b) by using a chlorinated film-former in the final solution such as chlorinated rubber, polyvinyl chloride, polychlorstyrene, etc. (c) by combining both.

The usual procedure is to dissolve the chlorinated resin in a solvent. To this solution is added a paste made by grinding the flameproofing powder together with color pigments if desired in the chosen plasticizer.

A simple example of a flameproofing solution follows using chlorinated rubber as the film-former and chlorinated paraffin as the plasticizer.

Solution #1

| | Parts by weight |
|---|---|
| Toluol | 200 |
| Chlorinated rubber | 50 |
| Chlorinated paraffin (70%) | 40 |
| Chlorinated paraffin (42%) | 195 |
| Powder #1 | 230 |

The chlorinated rubber and the chlorinated paraffin (70%) are stirred into the toluol until completely dissolved and the powder #1 is ground (preferably in a three-roll mill) with the chlorinated paraffin (42%). The resulting paste is then stirred thoroughly into the chlorinated rubber solution and more toluol added as previously determined in order to leave the desired added weight on the goods. The goods are then dipped in this solution and the excess solution removed by any of the usual means. The goods are then dried in any suitable manner. With approximately 30% added weight the goods will be found little changed in appearance and feel and will be found to meet all the usual tests for flameproofness both before and after leaching and laundering.

Other examples illustrating different film-formers, different plasticizers and different powders follow.

Solution #2

| | Parts of weight |
|---|---|
| Hi-flash naphtha | 275 |
| Polychlorstyrene | 50 |
| Tri-cresyl phosphate | 40 |
| Chlorinated paraffin (42%) | 90 |
| Powder #2 | 105 |

Solution #3

| | Parts by weight |
|---|---|
| Methyl ethyl ketone | 600 |
| Toluol | 200 |
| Polyvinyl chloride | 100 |
| Chlorinated paraffin (70%) | 75 |
| Methyl pentachlor stearate | 175 |
| Powder #4 | 250 |

Solution #4

| | Parts by weight |
|---|---|
| Hi-flash naphtha | 100 |
| Transphalt 85 | 100 |
| Chlorinated paraffin (70%) | 150 |
| Chlorinated paraffin (42%) | 150 |

Dissolve these in the Hi-flash at about 170° F. and grind with:

| | |
|---|---|
| Powder #1 | 248 |

(Thin with more Hi-flash to leave the desired added weight on the goods.)

*Solution #5*

| | Parts by weight |
|---|---|
| Hi-flash naphtha | 187½ |
| Chlorinated rubber | 37½ |
| Chlorinated paraffin (70%) | 30 |
| Chlorinated paraffin (42%) | 145 |
| Ultramarine | 64 |
| Carbon black | 7 |
| Powder #3 | 174 |
| Calcium carbonate | 74 |
| Aluminum stearate | 10 |
| Copper naphthenate | 25 |
| Mineral spirits | 278 |

In certain cases the actual solution of the resin is not necessary as for instance in the case of the application of vinyl resin by the organosol or plastisol method. In this case the powder can be mixed directly with the organosols or plastisols and the whole mass fluxed on the goods to be treated.

The following is an illustration of the organosol type of flameproofing:

| | Parts by weight |
|---|---|
| Vinylite resin vinyl 1 | 500 |
| Ultramarine | 76 |
| Monastral Blue | 10 |
| Carbon black | 14 |
| Powder #4 | 350 |
| Methyl pentachlor stearate | 300 |
| Di octyl phthalate | 100 |
| Mineral spirits | 420 |
| Xylol | 180 |

The above are charged to a ball or pebble mill in any order and are allowed to grind until sufficiently well dispersed, usually 18 to 48 hours. The material is then ready for use and can be applied to the goods by any of the recognized methods, preferably by the conventional knife-coating technique. The degree of penetration into the cloth can be regulated both by the angle of the blade and by regulating the viscosity of the mixture. For good flameproofing results a high degree of penetration is desirable. In drying, the volatiles can be driven off in the ordinary ovens, but it is important that at some point in the drying cycle a temperature of 350° F. should be reached in order to melt the resin into a continuous film.

I claim:

1. A flameproofing composition which includes a chlorinated organic material which releases hydrochloric acid when heated, at least one metallic oxide capable of reacting with hydrochloric acid in the presence of cellulose at combustion temperatures higher than that at which the hydrochloric acid is normally liberated by the chlorinated material to form a flameproof compound, said metallic oxide being selected from the group consisting of oxides of zinc, tin, lead, magnesium, iron, manganese, molybdenum, tellurium, titanium, copper, chromium, aluminum, vanadium, and tungsten, an inhibitor adapted to retard the release of hydrochloric acid from the heated chlorinated material until the temperature is reached at which said reaction takes place, and a water-insoluble glowproofing material present in substantial quantities and consisting of a material selected from the group consisting of rosin amine phosphate, borate and silicate and octadecylamine phosphate, borate and silicate.

2. A flameproofing composition which includes a chlorinated organic material which releases hydrochloric acid when heated, at least one metallic oxide capable of reacting with hydrochloric acid in the presence of cellulose at combustion temperatures higher than that at which the hydrochloric acid is normally liberated by the chlorinated material to form a flameproof compound, said metallic oxide being selected from the group consisting of oxides of zinc, tin, lead, magnesium, iron, manganese, molybdenum, tellurium, titanium, copper, chromium, aluminum, vanadium and tungsten, an inhibitor adapted to retard the release of hydrochloric acid from the heated chlorinated material until the temperature is reached at which said reaction takes place, and a water-insoluble glowproofing material present in substantial quantities and consisting of a salt of a water insoluble long chain aliphatic amine and a mineral acid.

3. A flameproofing composition which includes a chlorinated organic material which releases hydrochloric acid when heated, at least one metallic oxide capable of reacting with hydrochloric acid in the presence of cellulose at combustion temperatures higher than that at which the hydrochloric acid is normally liberated by the chlorinated material to form a flameproof compound, said metallic oxide being selected from the group consisting of oxides of zinc, tin, lead, magnesium, iron, manganese, molybdenum, tellurium, titanium, copper, chromium, aluminum, vanadium and tungsten, an inhibitor adapted to retard the release of hydrochloric acid from the heated chlorinated material until the temperature is reached at which said reaction takes place, selected from the group consisting of basic lead carbonate, calcium silicate, lead silicate, lead sulfate, calcium stearate, calcium salicylate, calcium ethyl aceto-acetate, lead oleate, lead naphthenate, dibasic lead salt of stearic acid, and other organo-metallic lead salts, strontium naphthenate, dibutyl tin maleate, and tetraphenyl tin, and a substantial quantity of at least one metallic salt of a weak inorganic acid selected from the group consisting of stannates, zincates, borates, silicates, molybdates, vanadates and tungstates of the metals zinc, antimony, magnesium, tin, lead and zirconium.

4. A powder for compounding with hydrochloric acid liberating chlorinated organic materials to form a flameproofing composition which includes at least one metallic oxide, said metallic oxide being selected from the group consisting of oxides of zinc, tin, lead, magnesium, iron, manganese, molybdenum, tellurium, titanium, copper, chromium, aluminum, vanadium and tungsten, the total oxide being present in an amount of from about 40% to about 65% by weight of the dry solids and including substantial quantities of materials selected from the group consisting of zinc oxide, stannic oxide, magnesium oxide, lead oxide and ferric oxide, an inhibitor present in proportions of from about 20% to about 40% of the weight of the metallic oxide and selected from the group consisting of basic lead carbonate, calcium silicate, lead silicate, lead sulfate, calcium stearate, calcium salicylate, calcium ethyl aceto-acetate, lead oleate, lead naphthenate, dibasic lead salt of stearic acid, and other organo-metallic lead salts, strontium naphthenate, dibutyl tin maleate, and tetraphenyl tin, a substantial quantity of at least one metallic salt of a weak inorganic acid selected from the group consisting of stannates, zincates, borates, silicates, molybdates, vanadates and tungstates of the metals zinc, antimony, magnesium, tin, lead and zirconium, and a water-insoluble glowproofing and mildewproofing material present in substantial quantities and consisting of a salt of a water insoluble long chain aliphatic amine and a mineral acid.

5. A powder for compounding with hydrochloric acid liberating chlorinated organic materials to form a flameproofing composition which includes at least one metallic oxide, said metallic oxide being selected from the group consisting of oxides of zinc, tin, lead, magnesium, iron, manganese, molybdenum, tellurium, titanium, copper, chromium, aluminum, vanadium and tungsten, the total oxide being present in an amount of from about 40% to about 65% by weight of the dry solids and including substantial quantities of materials selected from the group consisting of zinc oxide, stannic oxide, magnesium oxide, lead oxide and ferric oxide, an inhibitor present in proportions of from about 20% to about 40% of the weight of the metallic oxide and selected from the group consisting of basic lead carbonate, calcium silicate, lead silicate, lead sulfate, calcium stearate, calcium salicylate, calcium ethyl aceto-acetate, lead oleate, lead naphthenate, dibasic lead salt of stearic acid, and other organo-metallic lead salts, strontium naphthenate, dibutyl tin maleate, and tetraphenyl tin, a substantial quantity of at least one metallic salt of a weak inorganic acid selected from the group consisting of stannates, zincates, borates, silicates, molybdates, vanadates and tungstates of the metals zinc, antimony, magnesium, tin, lead and zirconium, and a water-insoluble glowproofing and mildewproofing material present in substantial quantities and consisting of a salt of a water insoluble long chain aliphatic amine and a mineral acid.

6. A powder for use in flameproofing and glowproofing consisting of substantial quantities of at least one metallic oxide, said metallic oxide being selected from the group consisting of oxides of zinc, tin, lead, magnesium, iron, manganese, molybdenum, tellurium, titanium, copper, chromium, aluminum, vanadium and tungsten, and a water-insoluble glowproofing material present in substantial quantities and consisting of a salt of rosin amine and a weak acid.

7. A powder for use in flameproofing and glowproofing consisting of substantial quantities of at least one metallic oxide, said metallic oxide being selected from the group consisting of oxides of zinc, tin, lead, magnesium, iron, manganese, molybdenum, tellurium, titanium, copper, chromium, aluminum, vanadium and tungsten, and a water-insoluble glowproofing material present in substantial quantities and consisting of a salt of a water insoluble aliphatic long chain amine and a mineral acid.

HARRY HOPKINSON.

REFERENCES CITED

The following references are of record in the file of this patent:

UNITED STATES PATENTS

| Number | Name | Date |
| --- | --- | --- |
| 2,044,176 | McCulloch | June 16, 1936 |
| 2,071,353 | Morgan | Feb. 23, 1937 |
| 2,286,744 | Leatherman | June 16, 1942 |
| 2,299,612 | Clayton et al. | Oct. 20, 1942 |
| 2,326,233 | Leatherman | Aug. 10, 1943 |
| 2,378,715 | Leatherman | June 19, 1945 |
| 2,463,983 | Leatherman | Mar. 8, 1949 |

OTHER REFERENCES

Redmond, American Dyestuff Reporter, vol. 32, No. 18, August 30, 1943, pp. 375, 377.